United States Patent
Wang et al.

(10) Patent No.: US 9,469,549 B2
(45) Date of Patent: Oct. 18, 2016

(54) PROCESS FOR RECOVERY OF FLUORIDE FROM WASTEWATER PRODUCED IN CRYSTALLINE SILICON SOLAR CELL MANUFACTURING

(71) Applicant: Beijing Guohuan Tsinghua Environment Engineering Design & Research Institute Co., Ltd., Beijing (CN)

(72) Inventors: Cheng-Wen Wang, Beijing (CN); Yan Li, Beijing (CN); Hongxiang Fu, Beijing (CN); Xuefeng Zhao, Beijing (CN)

(73) Assignee: Beijing Guohuan Tsinghua Environment Engineering Design & Research Institute Co., Ltd., Beijing (CN)

( * ) Notice: Subject to any disclaimer, the term of this patent is extended or adjusted under 35 U.S.C. 154(b) by 357 days.

(21) Appl. No.: 14/099,452

(22) Filed: Dec. 6, 2013

(65) Prior Publication Data
US 2014/0161714 A1 Jun. 12, 2014

(30) Foreign Application Priority Data
Dec. 8, 2012 (CN) .......................... 2012 1 0525940

(51) Int. Cl.
| | |
|---|---|
| C02F 1/28 | (2006.01) |
| B01D 21/01 | (2006.01) |
| C02F 1/52 | (2006.01) |
| B01D 21/26 | (2006.01) |
| B01D 29/00 | (2006.01) |

(Continued)

(52) U.S. Cl.
CPC ........... *C01F 11/22* (2013.01); *B01D 21/2488* (2013.01); *B01J 8/18* (2013.01); *B01J 8/1809* (2013.01); *B01J 8/24* (2013.01); *C02F 1/5236* (2013.01); *C02F 1/583* (2013.01); *C02F 1/66* (2013.01); *B01D 15/02* (2013.01); *B01D 21/01* (2013.01); *B01D 21/02* (2013.01); *C02F 2101/14* (2013.01); *C02F 2103/346* (2013.01); *C02F 2103/40* (2013.01); *Y02W 10/37* (2015.05)

(58) Field of Classification Search
None
See application file for complete search history.

(56) References Cited

U.S. PATENT DOCUMENTS

| | | | | |
|---|---|---|---|---|
| 4,028,237 A | * | 6/1977 | Nishimura | C01F 11/00 210/724 |
| 5,106,509 A | * | 4/1992 | Jansen | C02F 1/5236 210/715 |

(Continued)

*Primary Examiner* — Nam Nguyen
*Assistant Examiner* — Clare Perrin
(74) *Attorney, Agent, or Firm* — Osha • Liang LLP (57) ABSTRACT

A method for processing fluoride-containing wastewaters from a factory, which includes the following steps: Step 1: collecting the fluoride-containing wastewaters into three pools: an acidic high-fluoride wastewater, an acidic low-fluoride wastewater, and an alkaline wastewater; Step 2: adding a calcium compound to the acidic low-fluoride wastewater to produce a calcium-containing solution; Step 3: reacting a portion of the calcium-containing solution with the acidic high-fluoride wastewater at a calcium-to-fluoride molar ratio of from about 0.5:1 to about 1.5:1 to produce a mixture comprising calcium fluoride particles suspended in a mother liquor; Step 4: separately collecting the calcium fluoride particles and the mother liquor; Step 5: diluting the mother liquor with a diluent to produce a mixed solution; and Step 6: introducing the mixed solution, the calcium-containing solution, and the alkaline wastewater into a fluidized bed reactor, which contains a calcium fluoride crystallization seed material, to form calcium fluoride crystals.

11 Claims, 3 Drawing Sheets

(51) Int. Cl.
*B01J 8/18* (2006.01)
*C01F 11/22* (2006.01)
*B01D 21/24* (2006.01)
*B01J 8/24* (2006.01)
*C02F 1/58* (2006.01)
*C02F 1/66* (2006.01)
*B01D 21/00* (2006.01)
*B01D 15/00* (2006.01)
*C02F 1/00* (2006.01)
*B03D 3/00* (2006.01)
*B01D 37/00* (2006.01)
*B01J 8/00* (2006.01)
*C01F 11/00* (2006.01)
*B01D 15/02* (2006.01)
*B01D 21/02* (2006.01)
*C02F 103/34* (2006.01)
*C02F 103/40* (2006.01)
*C02F 101/14* (2006.01)

(56) References Cited

U.S. PATENT DOCUMENTS

| | | | |
|---|---|---|---|
| 5,849,194 A * | 12/1998 | Yamasaki | C02F 1/583 210/614 |
| 6,210,589 B1 * | 4/2001 | Lee | D01F 6/84 210/711 |
| 2007/0241041 A1 * | 10/2007 | Shimamura | C02F 11/127 210/197 |
| 2009/0082607 A1 * | 3/2009 | Huang | A62D 3/33 588/313 |
| 2009/0180947 A1 * | 7/2009 | Momota | B01D 9/0036 423/483 |
| 2012/0116133 A1 * | 5/2012 | Bossoutrot | C01F 11/22 570/226 |

* cited by examiner

PROCESS FOR RECOVERY OF FLUORIDE FROM WASTEWATER PRODUCED IN CRYSTALLINE SILICON SOLAR CELL MANUFACTURING

FIELD OF THE INVENTION

The present invention relates to a process for recovering fluoride from fluoride-containing wastewater. More specifically, it relates to a process for recovering fluoride as calcium fluoride from fluoride-containing wastewater, for example, produced in the manufacture of crystalline silicon solar cell. The recovered calcium fluoride has high purity and large particle sizes. Therefore, it may be used as a raw material for producing hydrogen fluoride or for other applications.

BACKGROUND OF THE INVENTION

Many industrial operations generate fluoride-containing wastewater. For example, even though the process of generating green photovoltaic (PV) electricity from solar cells creates no pollution or waste, the manufacture of solar cells can produce serious pollutions. The fluoride-containing wastewater accounts for a very large percentage of the total hazardous wastes generated in crystalline silicon solar cell manufacturing. The fluoride-containing wastewater must be treated to comply with the industrial effluent discharge standards. For clarity, the following description may use the production of crystalline silicon solar cells as an example to illustrate the invention. However, one skilled in the art would appreciate that embodiments of the invention can also be used with fluoride-containing wastewater generated in other operations.

Figure 1:
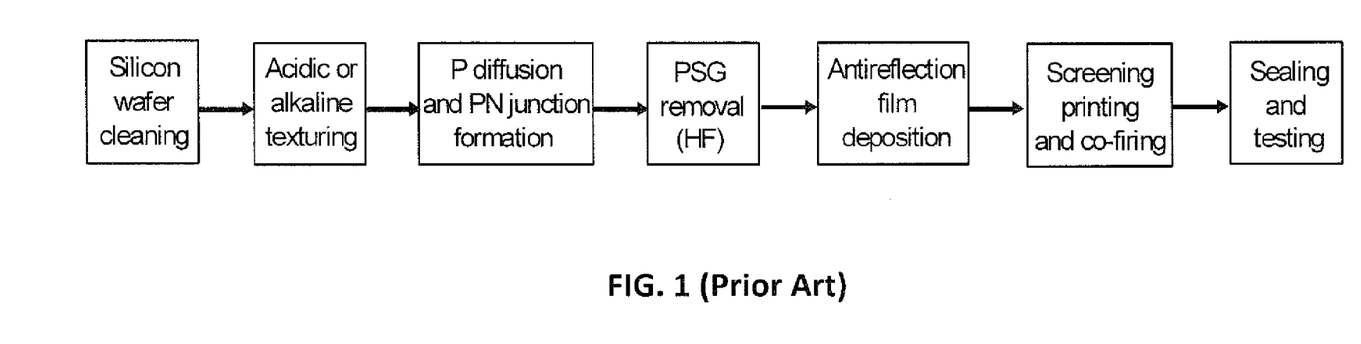
FIG. 1 shows a flowchart illustrating a process flow diagram for the manufacturing of crystalline silicon solar cells.

Crystalline silicon solar cells are made from thin silicon wafers or slices, and the manufacture process consists of six main steps, viz, cleaning, texturization, emitter formation, antireflection film deposition, metallization, and cell testing, as shown in FIG. 1. These six steps are briefly described as follows:

Cleaning

Raw silicon wafers are etched in hydrochloric acid (HCl) baths to remove organics, silicon carbide and other impurities produced from the wafering processes. The HCl etching process leaves a waste hydrochloric acid pickling liquor.

Texturization

Texturization is a process to etch the wafers to remove any residual saw damages and to form surface textures to improve crystalline silicon solar cell efficiencies by lowering surface reflection and increasing light absorption. Anisotropic alkaline texturing is mainly used for mono-crystalline silicon wafers, while isotropic acidic texturing is mainly used for multi-crystalline silicon wafers.

In alkaline texturing, silicon wafer is typically textured in a mixture of sodium hydroxide (NaOH) and isopropanol (IPA) at 80° C. After texturing, the wafers are rinsed in deionized (DI) water, cleaned in hydrochloric acid (HCl) solution, rinsed in DI water, cleaned in hydrofluoric acid (HF) solution, rinsed in DI water, and then dried in hot air. In this process, HCl is used to remove metal impurities from the wafer surface, while HF is used to strip native silicon dioxide and to form a hydrophobic surface. This process produces a waste NaOH texturing liquor, a waste HCl acid pickling liquor, and a waste HF acid pickling liquor, and.

In acidic texturing, silicon wafer is generally textured in a mixture of hydrofluoric acid (HF) and nitric acid ($HNO_3$), wherein $HNO_3$, an oxidizing agent, is used to form a silicon oxide on the surface of the wafer. After texturing, the wafers are rinsed in deionized (DI) water, cleaned in alkaline (NaOH) solution, rinsed in DI water, cleaned in hydrofluoric acid (HF) solution, rinsed in DI water, and then dried in hot air. This process leaves a waste $HNO_3$/HF acid pickling liquor and a waste NaOH rinsing liquor.

Emitter Formation

In a p-type silicon solar cell, the emitter layer is formed by thermal diffusion of phosphoric oxychloride ($POCl_3$) to form the pn junction. This thermal diffusion is typically performed in a diffusion oven at a temperature of 800-900° C.

In this process, $P_2O_5$ forms a layer of phosphor silicate glass (PSG) on the wafer, from which P atoms will diffuses into the upper part of the wafer. Meanwhile, after the diffusion step, the edges of the wafer also contain P atoms, and the edges must be isolated in order to prevent short-circuiting. PSG removal and edge isolation are completed by etching with a solution of HF and $HNO_3$.

After PSG removal and edge isolation, the wafers are rinsed in deionized (DI) water, cleaned in sodium hydroxide (NaOH) solution, rinsed in DI water, cleaned in HF/$HNO_3$ solution, rinsed in DI water, and then dried in hot air. This process leaves a waste $HNO_3$/HF acid pickling liquor, as well as a waste NaOH rinsing liquor.

Antireflection Film Deposition

The antireflection coating is carried out by plasma enhanced chemical vapor deposition (PECVD) of $Si_3N_4$ by the reaction between silane ($SiH_4$) and ammonia ($NH_3$). The exhaust of the PECVD reactor is connected with a silane burner, where excess silane is converted to $SiO_2$ and $H_2O$.

Metallization

A conductive pattern is screen printed onto the front wafer surface with a silver-rich paste. The front conductive pattern forms the busbar that will conduct the photo-electrons. A back print busbar is screen printed onto the cell's rear surface using a silver-rich paste. The rear busbar provides a means for soldering and interconnecting adjacent cells to make a solar panel. Finally, the entire rear surface is screen printed with aluminium to create a back field surface (BSF) and to enhance gettering. After the paste has been deposited, the wafers are fired in a belt oven. Emissions that occur during the firing process are evaporated solvents and burnt organic compounds.

Cell Testing

The cells are individually tested for electrical performance under Standard Test Conditions (STC) of 1 $kW/m^2$ (1 Standard Sun) irradiance and 25° C. Subsequently, the cells are graded into specific power bands for future cell stringing to make panels. This process does not produce wastes.

Among the processes described above, texturization, PSG removal, and edge isolation are typically performed in batch processes using inline equipment. Wafers are held in cassettes that allow chemicals to wet the entire surfaces of the wafers. These cassettes are moved automatically on rolls from one tank to another filled with chemicals for etching, cleaning, or rinsing.

The production process and the process parameters of different silicon solar cell manufacturers may vary. However, the produced wastewaters are essentially the same, which all consist of acid wastewater, alkaline wastewater, and rinsing wastewater. The main characteristics of these wastewaters are high acidity, high basicity, or high fluoride concentrations. The environmentally toxic pollutant in the wastewater is fluoride because of its demonstrated link to human fluorosis. Therefore, the fluoride-containing wastewater must be treated to meet the wastewater discharge standards of the local countries. For example, according to Chinese regulations for industrial wastewater, the permissible standard is $F^-\leq 20$ mg/l.

Until now, most crystalline silicon solar cell manufacturers use the precipitation-flocculation process for the removal of fluoride due to its relative simplicity and low costs. The process is shown in FIG. 2.

Figure 2:
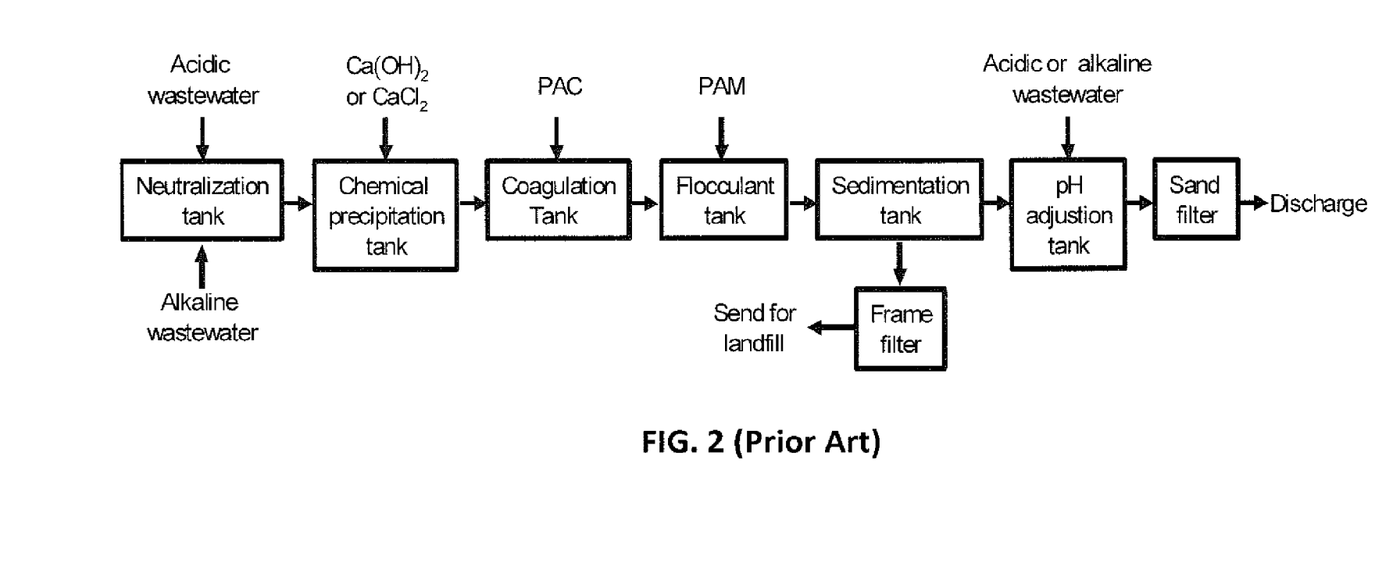
FIG. 2 shows a flowchart illustrating a prior art precipitation-flocculation process for the treatment of fluoride-containing wastewater.

As illustrated in FIG. 2, the acidic wastewater and alkaline wastewater are discharged, respectively. Then, the traditional precipitation-flocculation method is used to remove fluoride. This process consists of neutralization, chemical precipitation, flocculent precipitation, and filtration. The filtered calcium fluoride sludge is discarded.

In the precipitation-flocculation process, either calcium chloride ($CaCl_2$) or calcium hydroxide ($Ca(OH)_2$) is used to induce the precipitation of fluoride as calcium fluoride ($CaF_2$), according to the following chemical reactions:

$$Ca(OH)_2 + 2HF \rightarrow CaF_2 + 2H_2O$$

$$CaCl_2 + 2HF \rightarrow CaF_2 + 2HCl$$

When $Ca(OH)_2$ is used, it should be significantly overdosed to work effectively due to its low solubility. As a result, a larger amount of sludge is generated, and the unreacted sparsely soluble $Ca(OH)_2$ particles become the major constituent in the precipitated sludge. Therefore, $CaCl_2$ is the preferred choice due to its higher solubility, and a smaller amount of sludge is generated when $CaCl_2$ is used. However, when $CaCl_2$ is used, the very fine $CaF_2$ particles do not settle readily. Therefore, it becomes necessary to use flocculants, such as polyaluminum chloride (PAC) or polyacrylamide (PAM), to help bring down (flocculate) the fine $CaF_2$ particles for easier separation from the wastewater. In practice, many treatment plants use a combination of $Ca(OH)_2$ and $CaCl_2$ to enhance the settlement of $CaF_2$ precipitates, though a larger amount of sludge is produced, as compared to using only $CaCl_2$.

Similar precipitation-flocculation processes are described in U.S. Pat. No. 7,182,873 B2, Chinese Patent No. CN 101973662, Worf et al., "waste water treatment for crystalline silicon solar cell production," Photovoltaics International, 11th Edition, and Drouiche et al., "photovoltaic solar cells industry wastewater treatment," Desalination and Water Treatment, 2013, pp 1-9.

In these processes, the fluoride-containing wastewater may be introduced into a neutralization tank to neutralize it by adding NaOH or HCl. The neutralized wastewater is then delivered to a reaction tank to add $CaCl_2$ and/or $Ca(OH)_2$. Then, the wastewater and the generated calcium fluoride are delivered to a settling tank, therein agglutinators or flocculants are added to separate the calcium fluoride from wastewater.

The sludge generated in the precipitation-flocculation processes has a moisture content of as much as 50-60% and may contain a wide variety of impurities, such as $Al^{3+}$, $Cl^-$, $SO_4^{2-}$, unreacted $Ca(OH)_2$, etc. Therefore, the sludge cannot be used in other industrial applications. Nowadays, the $CaF_2$ sludge is typically transported to controlled hazardous waste disposal sites. Due to huge volumes, the disposal costs are high. Furthermore, the sludge has a potential to cause secondary pollution. For example, if the environment has acid rain or acidic soil, the fluoride ion in the sludge will enter into the groundwater and pollute the soil and water.

On the other hand, calcium fluoride is widely used as a feedstock in the manufacture of HF and as a fluxing agent in the steel industry, as well as in the production of glass, enamel, welding rod coatings, etc. Currently, almost all fluorine or fluoride used in various industries is processed from fluorspar ores. However, fluorspar is becoming a more and more precious non-renewable resource. Therefore, there is an urgent need to develop technologies for recovering fluoride from industrial fluoride-containing wastewater.

SUMMARY OF THE INVENTION

An object of the present invention is to provide a process for recovering fluoride as calcium fluoride from fluoride-containing wastewater, such as the fluoride-containing wastewater produced in the manufacture of crystalline silicon solar cell. More particularly, the present invention provides economically and ecologically beneficial treatment processes that can be used to recover, with high efficiencies (e.g., over 70%, over 80%, or over 90%), fluoride from a fluoride-containing wastewater. The fluoride-containing wastewater includes that produced in the manufacture of crystalline silicon solar cell or in other industrial operations. Embodiments of the invention may greatly reduce the amount of calcium fluoride sludge waste (for example, to zero) by producing calcium fluoride of higher purity (e.g., over 90%, over 95%, or over 98% pure) that can be used in other operations.

A process in accordance with embodiments of this invention may comprise four sections A, B, C and D. Section A may be referred to as "separate collection." Section B may be referred to as "preparation of calcium reagent solution." Section C may be referred to as "primary treatment." Section D may be referred to as "secondary treatment."

Section A comprises classifying and collecting the wastewater from a source, e.g., from the manufacture of crystalline silicon solar cell, into a few types (e.g., 3 types) of streams, according to the concentrations of fluoride and the pH values. For example, 3 types of streams may be, respectively, alkaline wastewater, acidic wastewater with a high fluoride concentration, and acidic wastewater with a low fluoride concentration.

Whether a particular wastewater is considered as having a high or low fluoride concentration may be based on a criterion (a threshold), which might be judicially selected based on the source of the wastewater. For example, for wastewater from crystalline silicon solar cell production, this criterion (threshold), for example, may be 1 g/L, 5 g/L, or 10 g/L. One skilled in the art would know that this criterion may be different for different sources of wastewater, and consideration may be given for efficient handling and treatment of the wastewater. Similarly, what is classified as high pH or low pH may be judicially determined based on another threshold. Typically, wastewater generated from the production of crystalline silicon solar cells may have a relatively high pH (e.g., >9.0, >10.0, or >11.0) or a relatively low pH (e.g., <5.0, <3.0, or <2.0). If desired the pH value of wastewater may be adjusted using a base or acid to a desired level.

In Section B, the acidic wastewater with a low fluoride concentration from Section A may be reacted with calcium carbonate ($CaCO_3$), calcium oxide (CaO) or calcium hydroxide ($Ca(OH)_2$) to prepare an aqueous solution containing $Ca^{2+}$ ion. This calcium-containing solution may be used to precipitate fluoride in the following processing steps.

In Section C, the aqueous solution containing $Ca^{2+}$ ion from Section B and the acidic wastewater with a high fluoride concentration from Section A are sent to the first reactor, wherein calcium fluoride is precipitated.

$$Ca^{2+} + 2F^- \rightarrow CaF_2\uparrow$$

The calcium fluoride precipitates are separated from the wastewater. The separation may use any equipment known in the art, such as a solid-liquid separator. The effluent from the separator would have a lower fluoride concentration and may be mixed with the rest of the acidic wastewater with a low fluoride concentration in a mixer tank. The reactor used in Section C may be a stirred tank reactor (STR) or any other suitable reactors.

In Section D, the mixed acidic wastewater from Section C and the prepared aqueous solution containing $Ca^{2+}$ ion from Section B are thoroughly mixed within the second reactor containing a suitable seed material such that the precipitated calcium fluoride can crystallize. In this treatment, the acidity of the mixed acidic wastewater may be adjusted by combination with the alkaline wastewater. The reactor used in this section may be a fluidized bed reactor (FBR) or any other suitable reactors. The $CaF_2$ particles produced from the first reactor in Section C may be used as seed materials. Alternatively, calcium fluoride particles or crystals from other sources may be used. The FBR may use an upflow of a liquid or diffused air to ensure that the mixture in the reactor remains homogeneous. The FBR unit may also comprise a clarifier, an aeration blower, and a delivery system for various liquid streams.

The above describes a preferred embodiment of the invention that includes four sections, in which sections C and D both produce calcium fluoride particles. One skilled in the art would know that Section C may precipitate most of the fluoride in the wastewater, and the effluent from Section C may contain relatively low concentrations of fluoride. In some situations, it may not be necessary to further remove fluoride from the "low fluoride-containing" water. In those cases, one may skip Section D, even though inclusion of Section D would produce more calcium fluoride and cleaner (containing less fluoride) wastewater.

Embodiments of the invention will now be illustrated with a specific process with more details. One skilled in the art would know that this particular example is for illustration only and that variations and modifications of various details are possible without departing from the scope of the invention. For example, a process for processing fluoride-containing wastewaters from a factory (e.g., the manufacture of crystalline silicon solar cells) in accordance with one embodiment of the invention may include the following steps:

Step 1: collecting the fluoride-containing wastewaters into three pools: an acidic high-fluoride wastewater that contains fluoride at a concentration higher than a first threshold concentration, an acidic low-fluoride wastewater that contains fluoride at a concentration lower than a second threshold concentration, and an alkaline wastewater.

As used herein, the term "acidic" refers to a pH value lower than 7, preferably lower than 5, such as 3, or 2, or lower, and the term "alkaline" refers to a pH value greater than 7, preferably greater than 9, such as pH 10 or 11 or higher.

As used herein, the term "high-fluoride" refers to a fluoride concentration higher than a threshold value, wherein the threshold value may be 1000 mg/L, preferably 2,000 mg/L, and more preferably 5,000 mg/L. As used herein, the term "low-fluoride" refers to a fluoride concentration lower than a threshold value, wherein the threshold value may be 2,000 mg/L, preferably 1,000 mg/L, more preferably 500 mg/L, and most preferably 100 mg/L.

Step 2: adding a calcium compound to a portion of the acidic low-fluoride wastewater to produce a "calcium-containing solution" that contains calcium at a concentration of about 1-500 g/L, preferably about 10-300 g/L, and more preferably about 80-120 g/L. In accordance with embodiments of the invention, the calcium compound may be calcium carbonate or any suitable calcium salt (e.g., $Ca(OH)_2$, $CaCl_2$, or CaO). The calcium compound (e.g., calcium carbonate) may be added as powders or as a suspension or solution in water at a suitable concentration (e.g., 5-50%).

Step 3: reacting a portion of the calcium-containing solution with the acidic high-fluoride wastewater at a suitable calcium-to-fluoride molar ratio, e.g., at a ratio of from about 0.5:1 to about 1.5:1, to produce a mixture comprising calcium fluoride particles suspended in a mother liquor. The term "molar ratio" as used herein has its regular meaning, i.e., a ratio of the moles of calcium and the moles of fluoride. The term "mother liquor" is used as its regular meaning, i.e., the liquid after precipitates are removed.

Step 4: processing the mixture to separately collect the calcium fluoride particles and the mother liquor. The processing involves separation of precipitates ($CaF_2$ particles) from the mother liquor. The mother liquor would have a lower concentration of fluoride ions. The separation can be performed with any method and equipment known in the art, such as gravitational settlement, filtration, or centrifugation. A suitable equipment may be a sedimentation centrifuge, a filtration centrifuge, or a pressure or suction filtration machine.

Step 5: diluting the mother liquor with a diluent to produce a mixed solution having a suitable pH value (e.g., about pH 2-6) and containing a suitable fluoride concentration (e.g., about 80-500 mg/L). The diluent used here may be any liquid (e.g., water) or solution with low or no fluoride ions. A convenient diluent for this, for example, may be the acidic low-fluoride wastewater obtained in Step 1. Using the acidic low-fluoride wastewater from Step 1 is advantageous because it would minimize the total volume of wastewater that needs to be disposed of.

Step 6: introducing the mixed solution from Step 5, the calcium-containing solution from Step 2, and the alkaline wastewater from Step 1 into a fluidized-bed reactor, which contains a calcium fluoride crystallization seed material, to form calcium fluoride crystals, wherein the alkaline wastewater is used to adjust a pH of the fluid in the fluidized-bed reactor (FBR) to a value between 5 and 8. The use of the alkaline wastewater to adjust pH has the advantage of minimizing the total volume of wastewater that needs to be disposed of, even though other source of alkaline solution may be optionally used here. In this step, a molar ratio between the calcium in the calcium-containing solution from Step 2 and the fluoride in the mixed solution from Step 5 is preferably controlled at a suitable ratio, such as 0.5:1 to 2:1.

In this Step 6, formation of calcium fluoride particles or crystals may be optimized at a suitable fluoride concentration and a suitable fluid flow rate in the FBR. The concentration of fluoride may be adjusted using water at the inlet. Alternatively, the effluent from the fluidized bed reactor in this Step 6 may be used. The effluent would have relatively lower concentration of fluoride ions and, therefore, can be used for this purpose. Using the effluent for this purpose has the advantage of minimizing the total volume of wastewater that needs to be disposed of. A suitable fluoride concentration, which may be determined by any suitable methods (e.g., by trial runs), for example may be at around 150 mg/L or lower. One skilled in the art would also know that a suitable flow rate in the fluidized bed reactor may be determined by any suitable methods (e.g., by trial runs). As an example, the flow rate in FBR may be controlled at about 100-20,000 m/hr.

A process in accordance with embodiments of this invention may have one or more of the following advantages:
1. markedly reduced sludge volumes and therefore reduced disposal costs;
2. recovery of the valuable resource $CaF_2$;
3. increased process stability and reliability; and
4. better effluent quality.

DETAILED DESCRIPTION OF THE INVENTION

Embodiments of the invention relate to methods (processes) for treating fluoride-containing wastewater. These processes not only remove the harmful fluoride from the wastewater, but also produce useful calcium fluoride for other applications. A process in accordance with embodiments of this invention may comprise four sections (or sub-processes) A, B, C and D. Section A may be referred to as "separate collection", Section B may be referred to as "preparation of calcium reagent solution", Section C may be referred to as "primary treatment," and Section D may be referred to as "secondary treatment."

Figure 3:
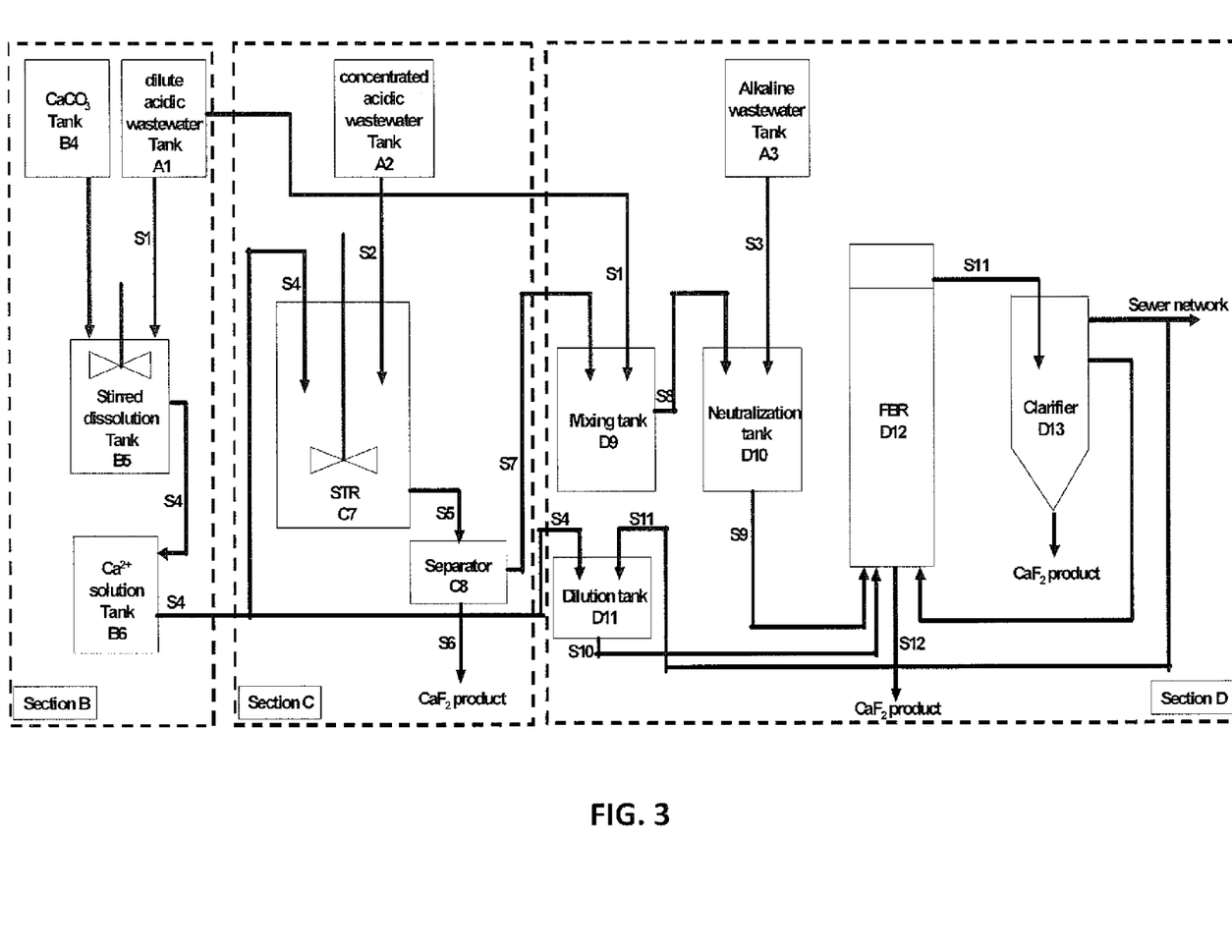
FIG. 3 shows a schematic illustration of a system for recovering fluoride from wastewater produced in the manufacture of crystalline silicon solar cells according to one embodiment of the present invention.

Referring to FIG. 3, in Section A, a wastewater (for example, a wastewater produced from the manufacture of crystalline silicon solar cells) may be classified into three types: an acidic wastewater with a low fluoride concentration (S1), an acidic wastewater with a high fluoride concentration (S2), and an alkaline wastewater (S3). The three types of wastewater may be stored, respectively, in a dilute acidic wastewater tank A1, a concentrated acidic wastewater tank A2, and an alkaline wastewater tank A3.

In accordance with embodiments of the invention, an acidic wastewater will have a pH value lower than 7. Because the acidic wastewater is typically from HCl wash or HF etch, its pH value is typically much lower than 7, such as 3 or lower. In accordance with embodiments of the invention, an alkaline wastewater will have a pH value higher than 7. Typically, a wastewater with a pH value over 9 may be collected as an alkaline wastewater.

In accordance with embodiments of the invention, an acidic wastewater with a fluoride concentration over 1,000 mg/l, preferably over 2,000 mg/l, more preferably over 5000 mg/l, may be collected as an acidic wastewater with a high fluoride concentration, while an acidic wastewater with a fluoride concentration below 1,000 mg/l, preferably below 500 mg/l, more preferably below 100 mg/l, may be collected as an acidic wastewater with a low fluoride concentration.

For instance, a wastewater from the cleaning step in the production of crystalline silicon solar cells contains only HCl. Therefore, it may be collected as an acidic wastewater with a low fluoride concentration (S1) and stored in the dilute acidic wastewater tank A1. A wastewater from the PSG removal step in the production of crystalline silicon solar cells, which may contain 2~4% HF, may be collected as an acidic wastewater with a high fluoride concentration (S2) and stored in the concentrated acidic wastewater tank A2. A wastewater from the alkaline texturing step in the production of crystalline silicon solar cells may be collected as an alkaline wastewater (S3) and stored in the alkaline wastewater tank A3.

Nowadays, the concentrations of chloride ion in wastewater are regulated in many countries, because high concentrations of chloride are harmful to aquatic plants and animals. To avoid pollution of chloride ion, the traditional and often-used precipitant $CaCl_2$ may be avoided in a method of the invention. In preferred embodiments, $Ca(OH)_2$, $CaO$, or $CaCO_3$ may be used.

In accordance with embodiments of the invention, in Section B, a new precipitant, an aqueous calcium-containing solution (S4), is prepared by dissolving a known amount of calcium carbonate (alternatively, calcium hydroxide or calcium oxide) stored in the $CaCO_3$ tank B4, into a certain amount of the collected dilute acidic wastewater (S1) in the stirred dissolution tank B5. The prepared solution (S4) may be filtered and then stored in the $Ca^{2+}$ solution tank B6. The prepared solution (S4) may be used as a precipitant in the following processing steps. In addition, to obtain the calcium fluoride products with high purities, the purity of calcium carbonate (calcium hydroxide or calcium oxide) should be high, such as above 80%, preferably over 90%, more preferably over 95%, and most preferably over 98%.

$$CaCO_3 + 2H^+ \rightarrow Ca^{2+} + H_2O + CO_2 \downarrow$$

$$Ca(OH)_2 + 2H^+ \rightarrow Ca^{2+} + 2H_2O$$

$$CaO + 2H^+ \rightarrow Ca^{2+} + H_2O$$

In accordance with embodiments of the invention, recovery zones for concentrated and dilute fluoride-containing wastewaters may be established in the primary treatment unit (Section C) and the secondary treatment unit (Section D), respectively.

In Section C (the primary treatment unit), the acidic wastewater with a high fluoride concentration (S2) is passed into the first reactor C7, and the aqueous calcium-containing solution (S4) is also passed into the reactor C7. The concentration of fluoride in the concentrated acidic wastewater (S2) may be measured using spectrophotometric techniques or any other suitable methods. The concentrated acidic wastewater (S2) and the aqueous calcium-containing solution (S4) may be agitated in the reactor C7. The agitation speed may be adjusted to ensure maximum reaction between $Ca^{2+}$ ion in the solution S4 and $F^-$ ions in the solution S2 and to ensure that all generated calcium fluoride particles are homogeneously distributed throughout the reactor C7.

After completion of the reaction, the reaction slurry in the reactor C7, i.e. the calcium fluoride slurry (S5), is sent from the reactor C7 to a solid-liquid separator C8, wherein the calcium fluoride particles are separated from the wastewater (may be referred to as a mother liquor). The solid-liquid separator C8 may be any suitable equipment known in the art (e.g., centrifuges, filtration equipment, etc.), preferably a centrifuge. After separation, calcium fluoride products (S6) and an effluent from the separator (S7) are obtained.

The reaction in the reactor C7 can be carried out at any suitable temperature, for example the temperature of the wastewater. However, the reaction is preferably carried out at a temperature between 30 and 60° C.

The residence time for the reaction in the reactor C7 may be from about half an hour to about 3 hours, preferably from about 1 hour to about 2 hours.

The concentration of $Ca^{2+}$ in the aqueous calcium-containing solution (S4) may be controlled, for example, between about 10 g/l and about 300 g/l, preferably between about 80 g/l and about 120 g/l.

The amount of the aqueous solution containing $Ca^{2+}$ ion (S4) added to the reactor C7 may be determined by MR1, which is a ratio of the moles of $Ca^{2+}$ ion in the solution S4 added into the reactor C7 to the moles of $F^-$ ion in the acidic wastewater with high fluoride concentration (S2) added into the reactor C7. MR1 is typically controlled at a value from 0.5 to 1.5, preferably a value of about 0.6. Because two fluoride ions react with one calcium ion, this MR1 ratio is sufficient to ensure most fluoride ion is reacted with calcium ion.

The reaction that occurs in reactor C7 normally produces only calcium fluoride particles. This result is due to the high acidity of the acidic wastewater with high fluoride concentration (S2), which is useful in avoiding co-precipitation of silicon and ensuring high purity of the produced calcium fluoride particles. However, the high acidity also results in high solubility of calcium fluoride and therefore a high concentration of fluoride in the effluent from the separator (S7). The effluent from the separator (S7) typically contains a lower fluoride concentration, for example from about 1,000 to about 4,000 mg/l fluoride if the starting wastewater contains more than 20,000 mg/l. The solution S7 may be mixed with the rest of the acidic wastewater with low fluoride concentration (S1) in the mixing tank D9 to get the mixed acidic wastewater (S8) for further treatment.

The primary treatment unit results in efficient recovery of a vast majority of fluoride from the acidic wastewater with high fluoride concentration (S2). Typically, if the molar ratio of calcium to fluoride (MR1) is 0.6, 70-90% fluoride in the acidic wastewater with high fluoride concentration (S2) can be recovered. In addition, due to the high acidity (the pH is typically below 3) of the acidic wastewater with high fluoride concentration (S2), the purity of the produced calcium fluoride particles (S6) is above 98%, which is pure enough to be used in many applications, such as for the manufacture of HF.

An important thing in Section C (the primary treatment unit) is proper selection of an appropriate reactor type. The selected reactor may be modified to adapt to the specific demands imposed by the characteristics of the wastewater and the specific operational conditions. A stirred tank reactor (STR) may be preferably chosen as the primary treatment unit in accordance with embodiments of this invention for two reasons. First, the acidic wastewater with high fluoride concentration (S2) presents a high acidity (typically with a pH value below 3, such as between 2 and 3), a high fluoride concentration (e.g., ≥2,000 mg/l, preferably ≥5,000 mg/l), and a high ionic strength. Under these conditions, only precipitation process, rather than other methods, allows one to separate and recover fluoride from the wastewater with high efficiencies. Secondly, a stirred tank reactor (STR) is an important precipitation reactor. Industrially, this reactor is easily implemented and easy to control the particle size distribution and the purity of the particles.

The process performed in the primary treatment unit (Section C) may be performed in a continuous manner, but preferably in a semi-batch manner because the amount of the acidic wastewater with high fluoride concentration (S2) only accounts for about 1% to 3% of the whole wastewater. Embodiments of the present invention are not limited to the particular methods described here.

The secondary treatment unit (Section D) is used to treat the mixed acidic wastewater (S8) which often contains low concentrations of fluoride, such as from about 80 mg/l to 500 mg/l fluoride. The pH value of the mixed acidic wastewater (S8) is relatively low and needs to be raised to at least 6 before the secondary treatment can take place. To raise the pH value, the mixed acidic wastewater (S8) may be mixed with the alkaline wastewater (S3) in the neutralization tank D10 to produce the neutralized wastewater (S9). The pH of the neutralized wastewater (S9) may be controlled between 5 and 8, preferably, between 7 and 8, using an on-line pH meter. The concentration of fluoride in the neutralized wastewater (S9) may be measured using an on-line fluoride ion selective electrode. The aqueous calcium-containing solution (S4), which is prepared in the Section B, may be also used as the precipitator in the secondary treatment unit. In the dilution tank D11, the aqueous calcium-containing solution (S4) may be diluted with the treated wastewater (S11), using a flow calibration tube, such that the concentration of $Ca^{2+}$ ions in the diluted calcium reagent solution (S10) is controlled at a suitable level, such as below 10 g/l.

The neutralized wastewater (S9) containing fluoride and the diluted calcium reagent solution (S10) are then delivered into the fluidized bed reactor (FBR) D12, in an upward turbulent flow through the supply system and the distributor, in such a way that the solutions are distributed evenly over the cross section of the reactor D12. The reactor D12 contains a fluidized bed of seed materials, which may be the calcium fluoride particles (S6) separated from the solid-liquid separator C8 in Section C. The rates of supply of the solutions S9 and S10 should preferably be controlled to ensure a fluidized state of the bed seed materials. The neutralized wastewater (S9) containing fluoride and the diluted calcium reagent solution (S10) are thoroughly mixed and reacted in the fluidized bed reactor (FBR) D12, wherein crystals of calcium fluoride would form, and the formed calcium fluoride would crystallize on the seed materials.

The calcium fluoride seeds grow by a combination of crystal growth and agglomeration between the seed pellets and the newly formed calcium fluoride from the liquid phase. As the seeds grow, they become heavier and tend to move downward within the FBR D12. Over time, the largest particles tend to accumulate in the lower part of the FBR D12, the smallest particles tend to accumulate in the upper part of the FBR D12, and the intermediated-sized particles tend to accumulate in the middle part of the FBR D12. After the FBR D12 has been running for a sufficient duration, the lower part of the FBR D12 will contain pellets of calcium fluoride, which are large enough to be harvested. These large calcium fluoride pellets (S12) may be removed from the reactor D12 periodically, and the fresh seeds are supplemented simultaneously to ensure the maintenance of a well-functioning fluidized bed. After having been removed from FBR D12, the calcium fluoride pellets can be washed and dried. Any suitable drying method may be used. The treated wastewater (S11), which typically contains fluoride at a concentration below 10 mg/l, is then discharged from the FBR D12 into the sewer network of a downstream wastewater treatment plant. If desired, the treated wastewater (S11) may be delivered to a clarifier D13 for reuse or recovery.

The reaction in the FBR D12 may be carried out at any suitable temperature, such as the temperature of the wastewater. However, the reaction is preferably carried out at a temperature between 10 and 30° C.

As noted above, the calcium fluoride seeds grow through a combination of crystal growth and agglomeration. However, competing reactions such as discrete nucleation and abrasion also take place in the liquid phase. Discrete nucleation and abrasion of the seeds in the liquid phase lead to the formation of fines, which may leave the reactor together with the remaining fluoride in the effluent. The formation of the fines reduces the recovery efficiency of reactor D12.

To minimize the formation of fines, the supersaturation in the FBR D12 should be controlled in the metastable region. The control of the supersaturation depends upon the control of the parameters of the wastewater entering the system, such as the temperature, the concentration of the species, and the pH of the wastewater, etc. In accordance with the processes of this invention, the most effective way to maintain the appropriate supersaturation conditions at the inlet of the FBR D12 is to control the concentration of fluoride in the neutralized wastewater (S9) below 200 mg/l, preferably below 150 mg/l.

The amount of the diluted calcium reagent solution (S10) added to the FBR D12 is determined by MR2. MR2 is the ratio of the moles of calcium in the solution S10 added into the FBR D12 to the moles of fluoride in the neutralized wastewater (S9) added into the FBR D12. In general, for a fixed concentration of fluoride, the removal ratio of fluoride increases almost linearly with an increase in the MR2, when the MR2 is below 0.5. This is not surprising because two fluoride ions react with one calcium ion to form calcium fluoride. In accordance with embodiments of this invention, MR2 typically has a value of from 0.5 to 2.0, preferably a value of about 0.6-1.5, more preferable from about 0.6-1.0, and most preferably about 0.6.

MR2 may be controlled by a molar ratio controller. An MR2 molar ratio controller may comprise any suitable programmable process controller. Those skilled in the field of this invention are familiar with the selection and programming of such controllers. In accordance with embodiments of this invention, for example, an MR2 controller may receive a signal from the fluoride ion selective electrode and a signal from the flow gage as input signals. The fluoride ion selective electrode and the flow gage may be all located at the outlet pipe of the neutralized wastewater feed pump, or any other suitable locations in the flow path.

Based on the input signals, the MR2 controller controls a flow control mechanism that determines the addition rate of the diluted calcium reagent solution (S10) into the FBR D12. Any suitable metering mechanism may be used to control the addition rate of the solution (S10) into FBR D12. Such metering mechanisms may include metering pumps, variable valves, or the like. For example, the addition rate of the diluted calcium reagent solution (S10) may be determined as:

$$Q_{Ca} = \frac{2.1 \times MR2 \times Q_F \times C_F}{C_{Ca}}$$

where $Q_{Ca}$ and $Q_F$ (L/min) are the influent flows of the diluted calcium reagent solution (S10) and the neutralized wastewater (S9), respectively; $C_{Ca}$ and $C_F$ (mg/L) are the concentrations of calcium and fluoride in the diluted calcium reagent solution (S10) and in the neutralized wastewater (S9), respectively; MR2 is the molar ratio as defined above, and the constant 2.1 is the molecular weight ratio of Ca(40)/F(19).

The average upward fluid flow velocity, which is measured by dividing the total flow rate of all the streams by the cross sectional area of the reactor D12, should be sufficient to maintain calcium fluoride seeds in suspension. This flow velocity is typically in excess of about 30 m/h. The flow velocity can be controlled by adjusting the feeding pumps of the neutralized wastewater (S9) and the diluted calcium reagent solution (S10) to provide a desired combined flow.

The calcium fluoride products produced from Section D (the secondary treatment unit) may contain a low water content, such as about 3-7%. The thus-obtained particles can be used without a drying process for the further industrial applications. The purity of the thus produced calcium fluoride particles (S12) is typically above 97%, which is sufficient for use in the manufacture of HF.

The secondary treatment unit may be focused on recovery, less footprint, low reagent cost, safety and easier maintenance. The conditions of supersaturation, pH value, seeds and product quality are the most important factors that need be considered in FBR applications. Changing the operation variables, including the ratio of the amount of calcium reagent and wastewater, fluoride area loading, hydraulic retention times and upflow velocity, could influence the supersaturation in the reactor. It is desirable to use an on-line fluoride ion sensor in the reaction system to control that reaction in a metastable region so as to grow calcium fluoride crystal effectively.

With the above processes (Sections A, B, C and D), it is possible to treat fluoride-containing wastewater, such as that produced during crystalline silicon solar cell manufacturing, in an efficient manner. The final treated wastewater streams may have fluoride concentration below 10 mg/L. Particularly, fluoride in the wastewater is mostly recovered as valuable chemical feedstocks, and the amounts of calcium fluoride sludge are reduced to minimal or non-existence.

The following example is given to illustrate an embodiment in accordance with the principles of this invention. This example is for illustration only and is not to be viewed as limiting the scope of the present invention.

Example

A monocrystalline silicon solar cell manufacturer located in Jiangsu province of China was chosen for the demonstration.

Section A

In this section, a holistic look at the entire manufacture process of the silicon solar cell was taken to identify the various waste streams in the process. Raw wastewater samples were collected on a tank-by-tank basis, and the physico-chemical parameters, such as the pH value, the concentration of fluoride, chemical oxygen demand (COD), total nitrogen (TN), nitrate (N—$NO_3$) and total phosphorus (TP), of the wastewater samples were measured. The analytical data of the major effluents generated at different tanks are presented in Table 1.

TABLE 1

The quality parameters of the wastewater generated at different tanks

| | Tanks | pH | COD | N—$NH_4^+$ | Total P | Total N | $F^-$ |
|---|---|---|---|---|---|---|---|
| Texturization | Tank 1 | 13.2 | 488 | 0.09 | 17.8 | 12.9 | 137 |
| | Tank 2 | 13.8 | 57000 | 0.44 | 17.4 | 654 | 104 |
| | Tank 3 | 9.8 | <30 | 0.17 | 0.05 | 20.5 | 2.93 |
| | Tank 4 | 1.2 | <30 | 0.27 | <0.01 | 53.7 | 0.47 |
| | Tank 5 | 1.7 | <30 | 0.10 | 0.02 | 38.5 | 172 |
| | Tank 6 | 1.2 | 698 | 0.08 | <0.01 | 12.7 | 19800 |
| | Tank 7 | 6.5 | <30 | 0.04 | <0.01 | 23.3 | 1.19 |
| PSG removal | Tank 8 | 1.3 | 1430 | 0.27 | <0.01 | 111 | 22100 |
| and Edge | Tank 9 | 2.0 | <30 | 0.52 | 0.30 | 9.9 | 156 |
| isolation | Tank 10 | 13.1 | 138 | 0.07 | 63.2 | 64.1 | 648 |
| | Tank 11 | 11.1 | <30 | 0.08 | 0.05 | 31.9 | 2.62 |

In this case, the wastewaters were classified into 3 kinds of streams, according to the concentrations of fluoride and the pH values. The acidic wastewater with a fluoride concentration over 10000 mg/l was collected as a concentrated acidic wastewater (S2), while the acidic wastewater with a fluoride concentration below 200 mg/l was collected as a dilute acidic wastewater (S1). And the wastewater with a pH value over 9 was collected as an alkaline wastewater (S3). The average characteristics of the collected 3 streams are shown in Table 2.

TABLE 2

The average characteristics of so-collected 3 kinds of streams

| Types | pH | COD | N—$NH_4^+$ | Total P | Total N | $F^-$ | source |
|---|---|---|---|---|---|---|---|
| Alkaline wastewater (S3) | 13.9 | 25100 | 0.55 | 15.9 | 797 | 45 | Tank 1, 2, 3, 10, 11 |
| Concentrated acidic wastewater (S2) | 1.0 | 462 | 0.5 | 0.01 | 48.2 | 29200 | Tank 6, 8 |
| Dilute acidic wastewater (S1) | 1.0 | 1620 | 0.35 | <0.01 | 75.3 | 120 | Tank 4, 5, 7, 9 |

Section B

In this section, an aqueous calcium-containing solution (S4) is prepared by dissolving a known amount of calcium carbonate into a certain amount of the collected dilute acidic wastewater (S1) in a stirred dissolution tank. The prepared solution is filtered and then stored in the calcium-containing solution tank. The concentration of $Ca^{2+}$ in the solution is measured to be 90 g/L.

$$CaCO_3 + 2H^+ \rightarrow Ca^{2+} + H_2O + CO_2\downarrow$$

Section C

The primary treatment were carried out in a laboratory-scale cylindrical PTFE stirred tank crystallizer (1000 ml, d=95 mm) with 4 longitudinal baffles, two inlets for the aqueous calcium-containing solution (S4) and the concentrated acidic wastewater (S2), and a three-blade marine-type impeller covered with polyethylene in order to minimize the secondary nucleation. The crystallizer was immersed in a water bath thermostatically controlled within ±0.5° C. The stirring rate for the experiment was fixed at 300 rpm, which is sufficient to bring about full suspension of the solid-liquid system in the crystallizer.

In this example, the experiment was performed in a semi-batch mode. Four hundred (400) mL of the concentrated acidic wastewater (S2) with a fluoride concentration of 29,200 mg/L was poured into the crystallizer and stirred at 300 rpm. When the wastewater was heated to a temperature of 40° C., 136.6 mL of the prior prepared aqueous calcium-containing solution (S4) with a $Ca^{2+}$ concentration of 90 g/L was added to the crystallizer at a constant rate of 2 mL/min. After addition of the $Ca^{2+}$ aqueous solution, the reaction in the crystallizer was continued for 1 hour.

$$Ca^{2+} + 2F^- \rightarrow CaF_2\downarrow$$

Then, the calcium fluoride slurry (S5) in the crystallizer was separated by filtration. The separated calcium fluoride particles (S6) was washed and then air-dried at 80° C. for 24 h. The filtrate (S7) was collected for further treatment.

In this section, 20.3 g calcium fluoride was recovered from the concentrated acidic wastewater. That is, 84.7% of fluoride in the concentrated acidic wastewater was recovered. The purity of the calcium fluoride was 98.7%.

Section D

The filtrate (S7) from the section C was mixed with a certain amount of dilute acidic wastewater (S1) to obtain a mixed acidic wastewater (S8). The mixed acidic wastewater (S8) contains about 260 mg/L fluoride. To perform the secondary treatment, the mixed acidic wastewater (S8) is mixed with an alkaline wastewater (S3) to produce a neutralized wastewater (S9). The pH of the neutralized wastewater (S9) was controlled to be around 7. The concentration of fluoride in the neutralized wastewater (S9) was determined to be 110 mg/l. The aqueous calcium-containing solution (S4) prepared in Section B was diluted to obtain a diluted calcium reagent solution (510) containing $Ca^{2+}$ 200 mg/L.

Figure 4:
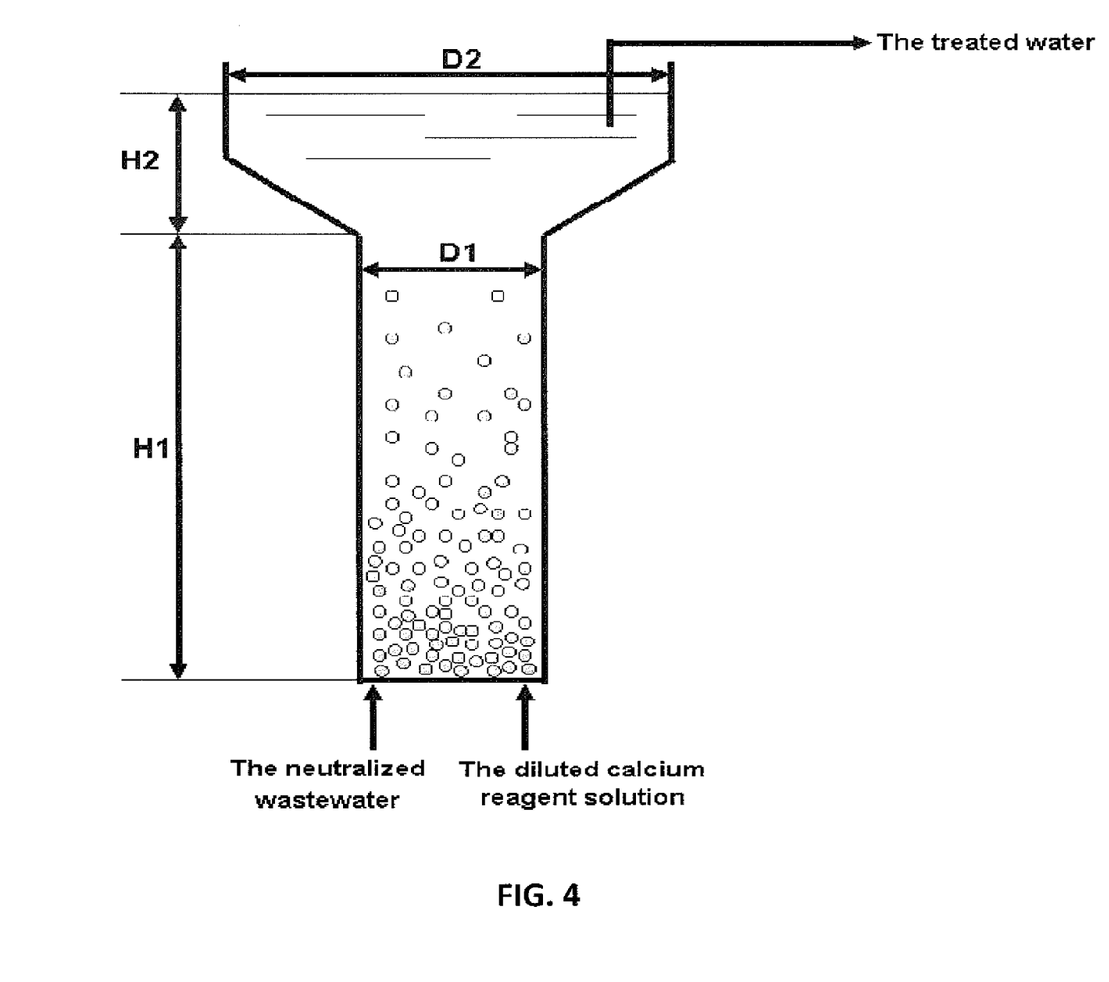
FIG. 4 shows a schematic illustration of a fluidized bed reactor in accordance with one embodiment of the present invention.

The secondary treatment was performed in a laboratory-scale fluidized bed reactor (FBR). The reactor was a cylindrical vessel adapted with a clarification compartment according to FIG. 4. In this example, the various dimensions of the reactor are as follows: D2=2D1=36 mm, and H2=H1/6=63 mm. One skilled in the art would appreciate that this is only an example and that proper dimensions of a reactor may be selected based on the scale of the operation without undue experimentation.

The neutralized wastewater (S9) and the diluted calcium reagent solution (S10) with the above mentioned compositions were introduced into the reactor in an upward flow using two peristaltic pumps. The inlet velocities of both solutions were controlled such that the seed materials present in the reactor was carried and maintained in fluidized bed conditions. In this example, the fluid velocity of the neutralized wastewater (S9) was in a range between 0.00015 and 0.0003 m/s, while the fluid velocity of the diluted calcium reagent solution (S10) was between 0.0001 and 0.0003 m/s.

The concentration of fluoride in the treated wastewater was analyzed with a fluoride ion electrode (Hach ISEF 121). The temperature in the reaction space was 30° C.

In this example, the seed materials were the wet, unwashed calcium fluoride product (S6) produced in Section C, and the amount of the seed materials was 250 g per liter of useful reactor volume. The calcium fluoride thus produced crystallizes out on the surfaces of the seed grains, thereby increasing the particle sizes of seed grains to 100-300 µm. From time to time, these grains were removed from the reactor, and the new seeds were replenished.

Due to friction of the calcium fluoride seed grains, calcium fluoride grits (fines) may be formed in the reactor. The grits may be carried along in suspension in the treated wastewater, which is undesirable. In order to prevent or minimize this, a clarification compartment connected to the FBR shown in FIG. 4 was used in this example. The grits thus formed, if any, in the treated water settled in the clarification compartment. Alternatively, a clarifier may be a unit separated from the FBR as shown in FIG. 3.

The operational parameters in the secondary treatment were carefully controlled in this example:
  The concentration of the fluoride in the neutralized wastewater (S9) was controlled around 110 mg/L;
  The concentration of $Ca^{2+}$ in the diluted calcium reagent solution (S10) was controlled around 200 mg/L; and
  The molar ratio of $Ca^{2+}$ to $F^-$ was controlled around 0.8.

After passing through the clarifier, the treated wastewater was discharged. The wastewater thus treated has a fluoride content of less than 10 ppm and is free from the said grit. The purity of the calcium fluoride recovered from the treatments was 97%.

While the above describe an example in accordance with one embodiment of the invention, one skilled in the art would appreciate that this is only for illustration and not intended to limit the scope of the protection. One skilled in the art after reading this description would appreciate that other modifications and variations are possible without departing from the scope of the invention.

What is claimed is:

1. A method for processing fluoride-containing wastewaters from a factory, comprising the following steps:
  Step 1: collecting the fluoride-containing wastewaters into three pools: an acidic high-fluoride wastewater that contains fluoride at a concentration higher than a first threshold concentration, an acidic low-fluoride wastewater that contains fluoride at a concentration lower than a second threshold concentration which is less than or equal to the first threshold concentration, and an alkaline wastewater;
  Step 2: adding a calcium compound to a portion of the acidic low-fluoride wastewater to produce a calcium-containing solution that contains calcium at a concentration of about 10-300 g/L;
  Step 3: reacting a portion of the calcium-containing solution with the acidic high-fluoride wastewater at a calcium-to-fluoride molar ratio of from about 0.5:1 to about 1.5:1 to produce a mixture comprising calcium fluoride particles suspended in a mother liquor;
  Step 4: processing the mixture to separately collect the calcium fluoride particles and the mother liquor;
  Step 5: diluting the mother liquor with a diluent to produce a mixed solution having a pH value of about 2-6 and containing a fluoride concentration of about 80-500 mg/L; and
  Step 6: introducing the mixed solution from Step 5, a remaining portion of calcium-containing solution from Step 2 which is not reacted in Step 3, and the alkaline wastewater from Step 1 into a fluidized bed reactor, which contains a calcium fluoride crystallization seed material, to form calcium fluoride crystals, wherein the alkaline wastewater is used to adjust a pH of a fluid in the fluidized bed reactor to a value between 5 and 8, wherein a molar ratio between the calcium in the calcium containing solution from Step 2 and the fluoride in the mixed solution from Step 5 is controlled at 0.5:1 to 2:1, wherein an effluent from the fluidized bed reactor is added to an inlet of the fluidized bed reactor to control a fluoride concentration at 150 mg/L or lower in an inlet region of the fluidized bed reactor, wherein a flow rate in the fluidized bed reactor is controlled at 100-20,000 m/hr.

2. The method of claim 1, further comprising:
  Step 7: introducing an effluent from the fluidized bed reactor into a precipitation tank to allow separation of solid and liquid before a supernatant from the precipitation tank is recycled into the fluidized bed reactor.

3. The method of claim 1, wherein the first threshold concentration is 5,000 mg/L and the second threshold concentration is 100 mg/L.

4. The method of claim 1, wherein the fluoride-containing wastewaters to be processed are from manufacturing of crystalline silicon solar cells.

5. The method of claim 1, wherein the calcium compound used in Step 2 is calcium carbonate.

6. The method of claim 5, wherein a purity of the calcium carbonate is 90% or higher.

7. The method of claim 5, wherein the calcium carbonate is added as a powder.

8. The method of claim 5, wherein the calcium carbonate is added as an aqueous suspension or solution of 5-50% calcium carbonate in water.

9. The method of claim 1, wherein the diluent used in Step 5 is the acidic low-fluoride wastewater from Step 1, which is not used in Step 2.

10. The method of claim 1, wherein the calcium fluoride crystallization seed material used in Step 6 is the calcium fluoride particles collected in Step 4.

11. The method of claim 1, wherein in the processing in Step 4 is performed using a sedimentation centrifuge, a filtration centrifuge, or a pressure filtration machine.

* * * * *